Patented Aug. 18, 1953

2,649,430

UNITED STATES PATENT OFFICE 2,649,430

VULCANIZATION

Julian R. Little, Packanack Lake, N. J., assignor to United States Rubber Company, New York, N. Y., a corporation of New Jersey No Drawing. Application January 30, 1951, Serial No. 208,659

18 Claims. (Cl. 260—41.5)

This invention relates to the vulcanization of synthetic rubber selected from the group consisting of polymers of aliphatic conjugated diolefins and copolymers of aliphatic conjugated diolefins with other copolymerizable monomeric material, which copolymers contain copolymerized therein at least 25% of aliphatic conjugated diolefin, by means of compounds having the formula

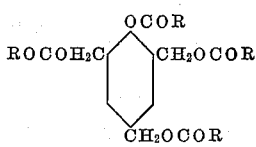

where R is lower alkyl, viz., $C_1$ to $C_6$ alkyl, by heating a mixture of the rubber with such a compound and carbon black under vulcanizing conditions.

A further aspect of the present invention relates to effecting such vulcanization in the presence of certain chemicals which function as vulcanization accelerators and which are capable of increasing the rate of vulcanization by compounds of the above formula up to a value double the rate obtained in the absence of such accelerators.

The method of the present invention comprises heating a mixture of synthetic rubber of the type defined above, carbon black in an amount equal to at least about 15 parts per 100 parts of said rubber, and a compound having the formula given above.

The vulcanizing agents of my invention can be made by synthetic procedures well-known in the art. Typically they are made by reacting a derivative of phenol having positions 2, 4, and 6 occupied by —CH₂A groups, where A is a disubstituted amino radical, with an anhydride of a lower aliphatic monobasic carboxylic acid, i. e., a lower fatty acid, whereby the A radicals and the hydrogen of the phenolic hydroxyl group are replaced with acyl groups corresponding to the anhydride employed.

The preferred vulcanizing agent of my invention is 2,4,6-tris-(acetoxymethyl-phenyl acetate.

The vulcanizing agents of my invention can be used in widely varying amount. I prefer, however, to use from 0.25 to 8 parts of such agent per 100 parts of the synthetic rubber.

It is essential that at least about 15 parts of carbon black is used per 100 parts of the rubber. The type of carbon black is not critical. The black can be any of the reinforcing, semi-reinforcing or non-reinforcing carbon blacks commonly used in the rubber industry. It can be made by any suitable process. Examples are channel black and furnace black. Acetylene black also is operative even though it is the least reinforcing of the rubber blacks. Examples of commercial blacks which can be used include Philblack O, Wyex, Kosmos 80, Statex B, Spheron 6, P-33, Thermax and Shawinigan. Of course, the physical properties of the vulcanizates will vary considerably depending upon the type of carbon black used, as is well-known to anyone skilled in rubber compounding. So far as vulcanization is concerned, the maximum amound of carbon black is not critical. However, those skilled in the art will understand that the practical maximum is that figure at which the physical properties of the vulcanizate begin to fall off objectionably.

Examples of synthetic rubber to which my invention is applicable include copolymers of butadiene and styrene whether made by the standard, i. e., hot process, or by the cold process; copolymers of butadiene and acrylonitrile, copolymers of butadiene and methyl acrylate, and homopolymers of aliphatic conjugated diolefins typified by butadiene. My invention can be applied to any rubbery copolymer of an aliphatic conjugated diolefin and another copolymerizable monomer, which copolymer contains copolymerized therein at least 25% of said diolefin. The synthetic rubber used must possess substantial olefinic unsaturation in order that it be vulcanized by the phenol derivatives of the present invention.

The synthetic rubber, carbon black and the vulcanizing agent of the present invention, together with any other desired materials such as other non-reinforcing fillers, or accelerators of the type described below, are intimately mixed in any convenient manner used in the rubber industry, e. g., on a rubber mill or in an internal mixer. The compounded rubber is then converted to any desired shape and size and is vulcanized at 150 to 250° C., preferably at 165 to 225° C., in any well-known manner as in a mold under pressure or in an open container in an oven.

A further feature of my invention comprises the addition of an alkanolamine, such as monoethanolamine, diethanolamine, or triethanolamine, paraformaldehyde, or an oxide of zinc or magnesium, as a vulcanization accelerator to the rubber-vulcanizing agent-carbon black mixture. The use of such accelerators greatly increases the rate of vulcanization and in many cases the time of vulcanization can be halved in this manner.

Paraformaldehyde behaves somewhat differently as an accelerator from the alkanolamines in that with paraformaldehyde the tensile strength and modulus flatten out to a plateau at a considerably later time than is the case when the alkanolamines are used.

The named metal oxides are not as active accelerators as the alkanolamines or paraformaldehyde.

The amount of alkanolamine, paraformaldehyde or selected metal oxide used as accelerator can vary widely but preferably ranges from 0.5 to 10 parts per 100 parts of the rubber.

The vulcanization procedure of the present invention has many advantages over previously known vulcanizing processes. Among these are the following:

1. The rubber stocks vulcanized by the new process of my invention have a far better resistance to oxidative aging than does rubber vulcanized with sulfur. For example, when aged in air at 100° C., the new stocks of my invention deteriorate less than one-third as rapidly as a standard sulfur stock. Thus, these new stocks are especially useful in products which must be kept for considerable periods of time at high temperatures. Such products are curing bags for tires, rubber motor mountings, steam hose, gaskets and belts for hot machinery, conveyor belts for moving hot materials, flexible hot air ducts, hot water bottles, etc.

2. The new stocks of the present invention may be used in contact with metals such as copper, silver, etc. which are tarnished by stocks vulcanized by sulfur. The advantages of using these new non-sulfur vulcanizates for rubber-metal objects; e. g., composite rubber and metallic cloth or fabric articles, rubber-insulated wire, head lights, silverware, copperware, etc. are obvious.

3. By carrying out the vulcanization in the presence of carbon black, the amount of the vulcanizing agent can be kept so low as to be commercially practical. For example, as indicated above, amounts ranging from 0.25 to 8 parts per 100 parts of rubber are eminently feasible. Prior art workers such as van der Meer—Dutch Patent 58,664, and Rubber Chemistry & Technology, 18, 853–73 (1945) and 20, 173–181 (1947)—reported that in most cases 40 to 50 parts of a phenolic compound were needed to vulcanize rubber in the absence of carbon black. It is well-known that the addition of carbon black to a stock containing sulfur as the vulcanizing agent decreases the effectiveness of the accelerator and stearic acid; i. e., that more of each is required in a rubber stock containing carbon black than in a gum rubber stock, to attain equivalent vulcanization. Furthermore, the sulfur level cannot be decreased because of the presence of the carbon black. Consequently, the great increase in the effectiveness of the vulcanizing agents of my invention as a result of the addition of carbon black was unexpected.

4. Previously, phenolic derivatives in which all three positions ortho and para to the phenolic hydroxyl group are substituted by groups capable of condensing with the rubber to form cross-linkages have not been successfully used as vulcanizing agents. In accordance with my invention compounds of the type just described are successfully used to vulcanize certain types of rubber in the presence of carbon black, thus greatly increasing the number of compounds which can be used for vulcanizing purposes in place of sulfur.

5. Another advantage of my invention is that whereas no one heretofore has been able to accelerate the vulcanization of rubber by phenolic compounds, I have discovered accelerators for use with my compounds which allow much more efficient use of vulcanizing equipment by greatly reducing the time of vulcanization.

6. The compounded but unvulcanized stocks made in accordance with the principles of my invention can be processed at higher temperatures without scorching than can stocks containing sulfur as the vulcanizing agent. This is particularly advantageous when shaping articles by injection molding.

The following examples illustrate the invention more fully. All parts mentioned in this specification are by weight.

*Example 1*

| Stock | A | B | C | D | E |
|---|---|---|---|---|---|
| GR-S | 100 | 100 | 100 | 100 | 100 |
| Philblack O [a] | 50 | 50 | 50 | | |
| Wyex [b] | | | | 50 | 50 |
| 2,4,6-Tris-(acetoxymethyl)phenyl acetate | | 5 | 5 | 5 | 5 |
| Triethanolamine | | | 2 | | 2 |
| Tensile strength (p. s. i.) | 240 | 860 | 1,800 | 390 | 580 |
| Elongation (percent) | 640 | 460 | 250 | 330 | 370 |
| Modulus at 200% elongation (p. s. i.) | 120 | 400 | 1,290 | 290 | 350 |

[a] A high abrasion furnace black.
[b] An easy processing channel black.

The above stocks were mixed and vulcanized in a press for 30 minutes at 195° C., and then tested at room temperature in a conventional manner. This example shows that 2,4,6-tris-(acetoxymethyl) - phenyl acetate vulcanizes GR–S in the presence of carbon black, and that triethanolamine considerably accelerates the vulcanization.

*Example 2*

The following stocks were mixed, vulcanized and tested as in Example 1.

| Stock | B | F |
|---|---|---|
| GR-S | 100 | 100 |
| Philblack O | 50 | 50 |
| 2,4,6-Tris-(acetoxymethyl)-phenyl acetate | 5 | 5 |
| Paraformaldehyde | | 2 |
| Tensile strength (p. s. i.) | 860 | 1,550 |
| Elongation (percent) | 460 | 460 |
| Modulus at 200% elongation (p. s. i.) | 400 | 540 |

It is evident that paraformaldehyde greatly accelerates the vulcanization.

*Example 3*

The following stocks were mixed, vulcanized and tested as in Example 1.

| Stock | B | G | H |
|---|---|---|---|
| GR-S | 100 | 100 | 100 |
| Philblack O | 50 | 50 | 50 |
| 2,4,6-Tris (acetoxymethyl)-phenyl acetate | 5 | 5 | 5 |
| Kadox zinc oxide | | 5 | |
| Magnesium oxide | | | 5 |
| Tensile strength (p. s. i.) | 860 | 1,210 | 950 |
| Elongation (percent) | 460 | 440 | 310 |
| Modulus at 200% elongation (p. s. i.) | 400 | 560 | 680 |

The above example shows the accelerating effect of zinc and magnesium oxides in my invention.

Example 4

The following stocks were mixed, vulcanized and tested as in Example 1.

| Stock | I | J | K | L |
|---|---|---|---|---|
| GR-S | 100 | 100 | 100 | 100 |
| Philblack O | 30 | 40 | 50 | 70 |
| 2,4,6-Tris(acetoxymethyl)-phenylacetate | 2 | 2 | 2 | 2 |
| Triethanolamine | 3 | 3 | 3 | 3 |
| Tensile strength (p. s. i.) | 1,050 | 1,490 | 1,510 | 1,140 |
| Elongation (percent) | 710 | 580 | 470 | 310 |
| Modulus at 200% elongation (p. s. i.) | 160 | 290 | 420 | 675 |

It is apparent that the amount of carbon black required is not critical at levels above 15 parts per 100 parts of rubber.

Example 5

The following stocks were mixed, vulcanized and tested as in Example 1 except that the time and temperature of vulcanization were as shown below.

| Stock | M-1 | M-2 | N-1 | N-2 | O-1 | O-2 |
|---|---|---|---|---|---|---|
| GR-S | 100 | 100 | 100 | 100 | 100 | 100 |
| Philblack O | 50 | 50 | 50 | 50 | 50 | 50 |
| Paraffin wax [a] | 2 | 2 | 2 | 2 | 2 | 2 |
| 2,4,6-Tris-(acetoxymethyl)-phenyl acetate | 5 | 5 | 5 | 5 | 10 | 10 |
| Triethanolamine | 5 | 5 | 10 | 10 | 10 | 10 |
| Time of vulcanization at 170° C. (min.) | 45 | 90 | 45 | 90 | 45 | 90 |
| Tensile strength (p. s. i.) | 1,080 | 1,200 | 1,300 | 1,530 | 1,210 | 1,130 |
| Elongation (percent) | 440 | 450 | 450 | 400 | 370 | 330 |
| Modulus at 200% elongation (p. s. i.) | 360 | 390 | 330 | 490 | 430 | 520 |

[a] Used as a mold lubricant.

The above example shows that the temperature of vulcanization and the amount of vulcanizing agent and accelerator required are not critical.

Example 6

Stocks P and Q were made in the same manner as before and vulcanized for 45 minutes at 195° C. The following data were obtained:

| Stock | P | Q |
|---|---|---|
| Hycar OR-15 [a] | 100 | 100 |
| Philblack O | 50 | 50 |
| 2,4,6-Tris-(acetoxymethyl) phenyl acetate | | 2 |
| Triethanolamine | | 3 |
| Tensile strength (p. s. i.) | 1,540 | 2,330 |
| Elongation (percent) | 300 | 260 |
| Modulus at 200% elongation (p. s. i.) | 840 | 1,420 |

[a] A butadiene acrylonitrile copolymer containing about 40% of acrylonitrile.

Example 6 shows that while the Hycar OR-15 can be considered to have been vulcanized in the absence of a phenolic compound, the addition of a small amount of a compound of the present invention greatly improves the strength of the vulcanizate.

Having thus described my invention, what I claim and desire to protect by Letters Patent is:

1. The method of vulcanizing synthetic rubber selected from the group consisting of homopolymers of an aliphatic conjugated diolefin and copolymers of an aliphatic conjugated diolefin and another monomer, which copolymers contain copolymerized therein at least 25% of an aliphatic conjugated diolefin, which comprises heating a mixture of said rubber, carbon black in an amount equal to at least 15 parts per 100 parts of said rubber, and a vulcanizing agent composed of a compound having the formula

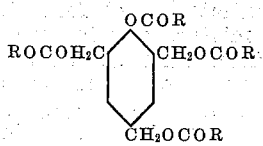

where R is lower alkyl.

2. The method of claim 1 wherein the amount of said vulcanizing agent ranges from 0.25 to 8 parts per 100 parts of said rubber.

3. The method of vulcanizing synthetic rubber selected from the group consisting of homopolymers of an aliphatic conjugated diolefin and copolymers of an aliphatic conjugated diolefin and another monomer, which copolymers contain copolymerized therein at least 25% of an aliphatic conjugated diolefin, which comprises heating a mixture of said rubber, carbon black in an amount equal to at least 15 parts per 100 parts of said rubber, and a vulcanizing agent composed of 2,4,6-tris-(acetoxymethyl)-phenyl acetate.

4. The method of claim 1 wherein said synthetic rubber is a copolymer of butadiene and styrene.

5. The method of claim 1 wherein said synthetic rubber is a copolymer of butadiene and acrylonitrile.

6. The method of claim 1 wherein said mixture also includes an alkanolamine as a vulcanization accelerator.

7. The method of claim 1 wherein said mixture also includes paraformaldehyde as a vulcanization accelerator.

8. The method of claim 1 wherein said mixture also includes zinc oxide as a vulcanization accelerator.

9. The method of claim 1 wherein said mixture also includes magnesium oxide as a vulcanization accelerator.

10. A vulcanizate of a mixture of synthetic rubber selected from the group consisting of homopolymers of an aliphatic conjugated diolefin and copolymers of an aliphatic conjugated diolefin and another monomer, which copolymers contain copolymerized therein at least 25% of an aliphatic conjugated diolefin, carbon black in an amount equal to at least 15 parts per 100 parts of said rubber, and a vulcanizing agent composed of a compound having the formula

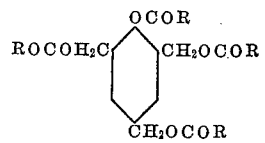

where R is lower alkyl.

11. A vulcanizate as set forth in claim 10 wherein the amount of said vulcanizing agent ranges from 0.25 to 8 parts per 100 parts of said rubber.

12. A vulcanizate as set forth in claim 10 wherein said synthetic rubber is a copolymer of butadiene and styrene.

13. A vulcanizate as set forth in claim 10 wherein said synthetic rubber is a copolymer of butadiene and acrylonitrile.

14. A vulcanizate as set forth in claim 10 wherein said mixture also includes an alkanolamine as a vulcanization accelerator.

15. A vulcanizate as set forth in claim 10 wherein said mixture also includes paraformaldehyde as a vulcanization accelerator.

16. A vulcanizate as set forth in claim 10 wherein said mixture also includes zinc oxide as a vulcanization accelerator.

17. A vulcanizate as set forth in claim 10 wherein said mixture also includes magnesium oxide as a vulcanization accelerator.

18. A vulcanizate of a mixture of synthetic rubber selected from the group consisting of homopolymers of an aliphatic conjugated diolefin and copolymers of an aliphatic conjugated diolefin and another monomer, which copolymers contain copolymerized therein at least 25% of an aliphatic conjugated diolefin, carbon black in an amount equal to at least 15 parts per 100 parts of said rubber, and a vulcanizing agent composed of 2,4,6-tris-(acetoxymethyl)-phenyl acetate.

JULIAN R. LITTLE.

References Cited in the file of this patent

Ser. No. 357,662, Wildschut (A. P. C.) published Apr. 20, 1943.